Sept. 27, 1966         M. RUDOLPH         3,275,726
METHOD OF AND APPARATUS FOR BLOW MOLDING LARGE HOLLOW BODIES
Filed Feb. 18, 1963         5 Sheets-Sheet 1
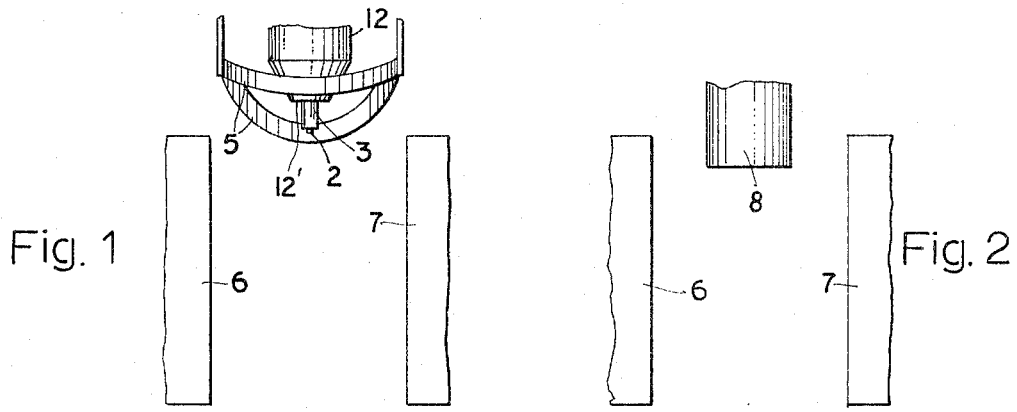
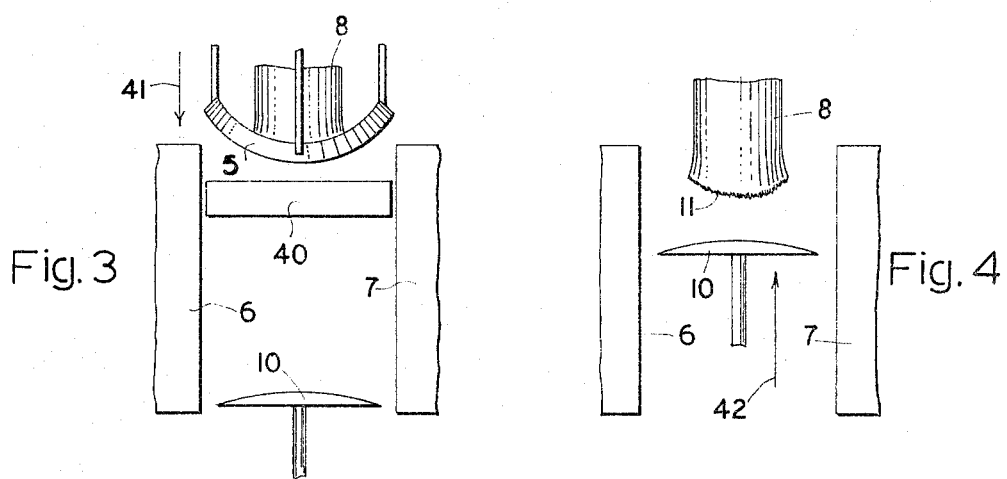
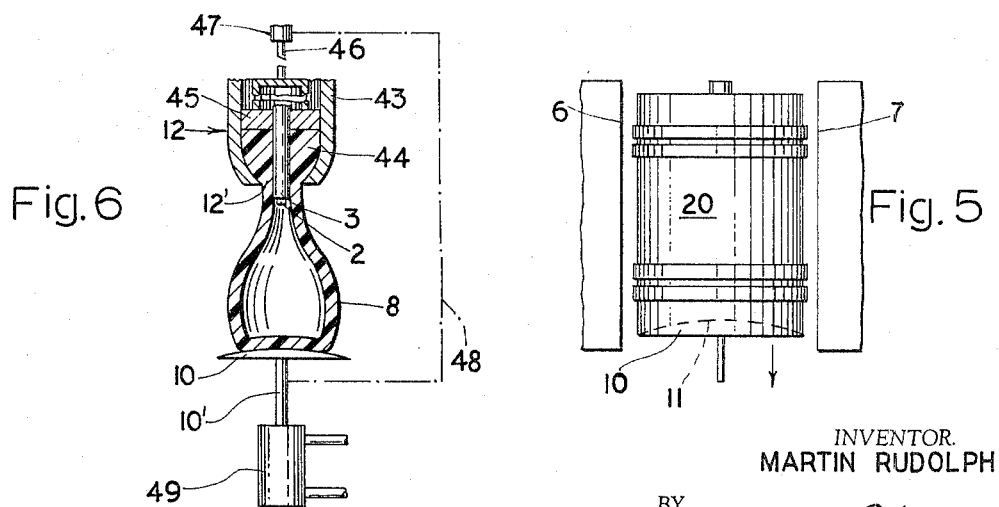
INVENTOR.
MARTIN RUDOLPH
BY
Karl F. Ross
AGENT Sept. 27, 1966  M. RUDOLPH  3,275,726
METHOD OF AND APPARATUS FOR BLOW MOLDING LARGE HOLLOW BODIES
Filed Feb. 18, 1963  5 Sheets-Sheet 2

INVENTOR.
MARTIN RUDOLPH
BY
Karl G. Ross
AGENT

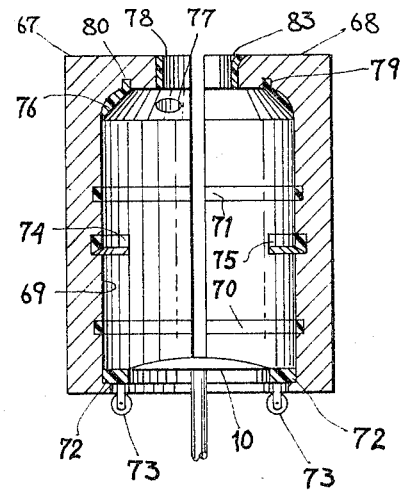
Fig. 15
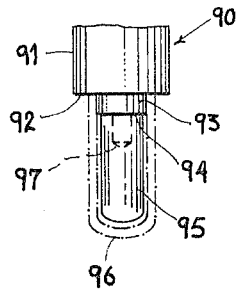
Fig. 17
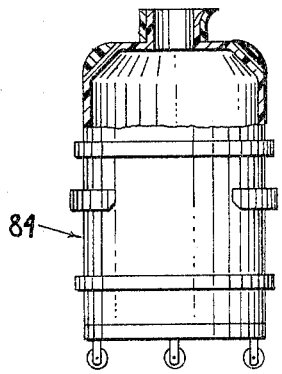
Fig. 16
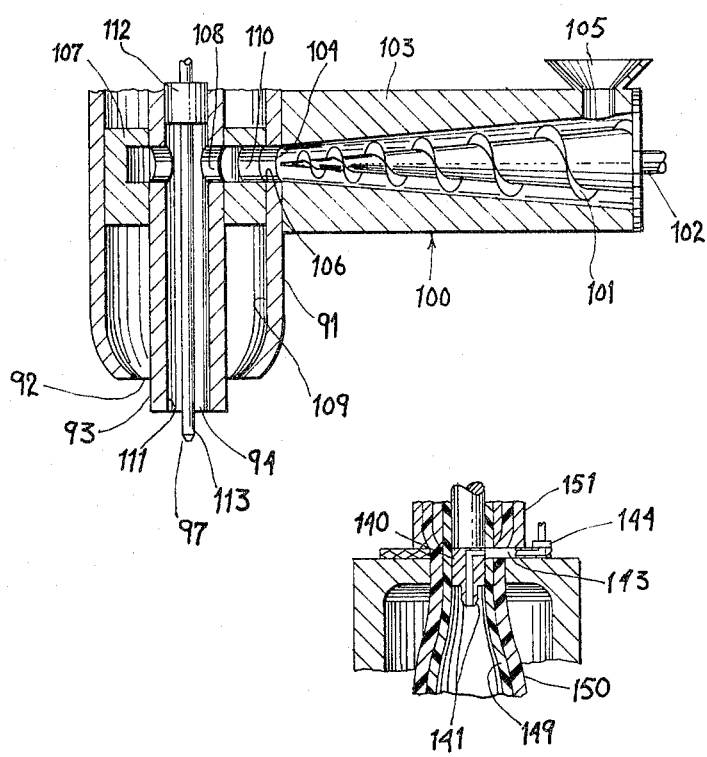
Fig. 18
Fig. 21
INVENTOR.
MARTIN RUDOLPH
BY
Karl F. Ross
AGENT Sept. 27, 1966　　　　M. RUDOLPH　　　　3,275,726
METHOD OF AND APPARATUS FOR BLOW MOLDING LARGE HOLLOW BODIES
Filed Feb. 18, 1963　　　　　　　　　　　5 Sheets-Sheet 4

INVENTOR.
MARTIN RUDOLPH
BY
Karl G. Ross
AGENT

Sept. 27, 1966    M. RUDOLPH    3,275,726
METHOD OF AND APPARATUS FOR BLOW MOLDING LARGE HOLLOW BODIES
Filed Feb. 18, 1963    5 Sheets-Sheet 5

INVENTOR.
MARTIN RUDOLPH
BY
Karl G. Ross
AGENT

United States Patent Office 3,275,726
Patented Sept. 27, 1966

3,275,726
METHOD OF AND APPARATUS FOR BLOW MOLDING LARGE HOLLOW BODIES
Martin Rudolph, 42 Schwanenstr., Velbert, Germany
Filed Feb. 18, 1963, Ser. No. 259,103
Claims priority, application Germany, Feb. 24, 1962, R 32,167; May 16, 1962, R 32,712
12 Claims. (Cl. 264—98)

The present invention relates to a method of and an apparatus for blow molding large hollow bodies and, more particularly to the production of such bodies from plastic (e.g., synthetic resin) material and other extrudable hardenable materials.

In the glass industry, a gather at the end of a blow pipe is frequently inserted into a mold and blown to the shape defined by the mold cavity. Similar applications of blow-molding techniques to synthetic plastics have resulted in a method wherein a U-shaped strip of plastic material is extruded and a mold clamped therearound while air or another fluid under pressure is introduced into the interior of the hollow plastic body to shape it in conformity with the mold configuration. These techniques were, however, only applicable to bodies of small size since, almost invariably, the molding process resulted in a considerable thinning out of the walls and in a receptacle having nonuniform wall thickness. Attempts to apply this technique to larger bodies resulted in the thermal fusion of wall portions of the extruded strip and, consequently, poor and nonuniform vessels. Moreover, the aforementioned method was characterized by the development of a partial vacuum prior to the injection of the expansion fluid, a difficulty which also gave rise to adhesion between opposite walls of the formed unit.

It is an object of the present invention to provide an improved method of producing large-capacity receptacles (e.g., those having a capacity of 5 liters and greater) which are particularly suitable for the transportation, handling and marketing of fluids in economically large quantities. Such receptacles include carboys, flasks for the storage of oil and beer, railroad transportation vessels and the like.

It is a corollary object of this invention to provide an apparatus capable of producing such receptacles without disadvantageous thinning of the walls and adapted to produce them at a higher rate than possible heretofore.

Still another object of my invention is to provide a method of and an apparatus for producing large-capacity vessels by blow molding wherein the aforementioned disadvantages of earlier techniques are obviated and whereby receptacles capable of rough handling can be manufactured with a minimum of operations and at relatively low cost.

These objects are attained, in accordance with the present invention, by a method of producing receptacles of large capacity from a tube of plastic material which is blow molded into shape; the present improvement involves a preliminary expansion with the aid of a fluid under pressure simultaneously with the extrusion of the plastic tube to insure the maintenance of a uniform cavity and also to produce a slight increase in the diameter thereof preparatorily to insertion of the preblown tube into the confines of a mold. The introduction of fluid under pressure is maintained and preferably increased after such insertion to urge the plastically deformable tube against the walls of the mold cavity so as to impart the configuration thereof to the plastic body.

According to a more specific feature of the invention, thinning out of the bottom-wall portions of the plastic body is reduced by supporting the lower end of the extruded tube while the latter is preliminarily blown. It is desirable to arrange the injection nozzle so that the tube is extruded downwardly with the pressure fluid being introduced during the extrusion step, the support descending substantially at the rate of extrusion so as to prevent undue thinning of the walls as a consequence of the weight of the tube. The use of a support for the base of the tube also renders it possible for the bottom of the receptacle to be shaped, e.g., provided with a concavity of sufficient depth to receive the neck of a similar receptacle disposed therebelow upon stacking of the containers. To permit the preblowing of the tube prior to insertion into the mold, the bottom or lower end of the tube must be substantially closed to prevent the escape of the expanding fluid. To this end it is preferred to provide means for clamping the lower end of the tube and thereby welding it shut when the tube is, as is customarily the case, in a plastically deformable state in which the wall portions thereof can be welded together under pressure or without an additional heating step. This lower end of the tube, into which the expanding fluid (preferably air) is constantly fed, is initially shaped with a convexity upon closing to provide the additional material necessary to form the aforedescribed convavity or recess without stretching of the tube in the region of its bottom.

The extruding nozzle can, of course, be provided with a substantially annular discharge aperture surrounding and coaxial with a forming mandrel which determines the caliber or bore of the extruded tube. This mandrel carries the expansion-fluid nozzle and may, according to another aspect of the invention, be removably mounted on the molding nozzle so that the plastic body, together with the enveloping mold, can be displaced relatively to the molding nozzle along with the mandrel for cooling at a location remote from the extrusion device. It is thus possible with, say, the aid of a turret upon which a plurality of molds are mounted, to employ a single extrusion device and recycle each of the molds to this device after removal of the cooled body therefrom without inactivating the extrusion device for the cooling period.

When the extrusion device is provided with a plurality of substantially concentric annular outlets, it is possible to provide a plurality of coaxial tubes which can, according to another specific feature of the present invention, be concurrently or successively blown to provide a finished body having laminated walls or so-called "double walls." When an internal and an external tube are simultaneously blown, a clearance can be established between them to receive a cushioning or insulating material as required. It is also contemplated, according to the invention, to provide the inner and outer tubes of different materials so that, for example, the internal tube can be a relatively soft synthetic resin incapable of withstanding severe handling but highly resistant to the contents of the vessel while the outer tube, although less resistant to the corrosive effects of the substance contained therewithin, is characterized by a relatively high toughness and resistance to abrasion. This arrangement prevents any corrosive contents from contacting the susceptible outer layer.

The above and other objects, features and advantages of the present invention will become more readily apparent from the following description, reference being made to the appended drawing in which:

FIGS. 1–5 are diagrammatic elevational views illustrating successive steps of the present process;

FIG. 6 is a partial axial cross-sectional view schematically illustrating an apparatus for carrying out this process;

FIG. 15 is an axial cross-sectional view through a mold cavity in accordance with the invention;

FIG. 16 is an elevational view, partly in section, of a transport flask produced with the mold of FIG. 15;

FIG. 17 is a diagrammatic elevational view of the extrusion means of an apparatus for producing multiwall vessels in conformity with the invention;

FIG. 18 is a diagrammatic axial cross-sectional view through another portion of the extrusion apparatus;

FIG. 19 is a plan view, partially in section and with parts broken away, of an apparatus for serially producing large-capacity vessels in accordance with the invention;

FIG. 21 is a view similar to FIG. 20 of a modified extrusion device;

Figure 8:
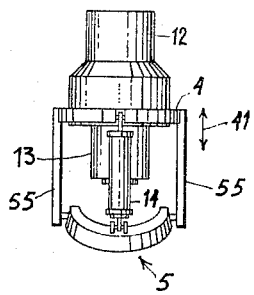
FIG. 8 is a front elevational view of the closing means.

In FIG. 1, I show an extrusion means 12 whose annular discharge aperture 12' coaxially surrounds a calibration mandrel 3 within which is mounted an air-injection nozzle 2. At the extruding station, a mold means, comprising a pair of mold halves diagrammatically illustrated at 6 and 7, is provided. Forwardly of the extrusion outlet 12' in the direction of displacement of the plastic material, there is provided a closing means, diagrammatically illustrated at 5, which, as described with reference to FIGS. 7 and 8 seals the free lower extremity of the tube.

A thermoplastic synthetic resinous material, such as polyethylene, is extruded in a heated state through the outlet 12' to produce a cylindrical tube 8 (FIG. 2) which descends between the mold halves 6 and 7. Air is introduced within this tube 8 by means of the nozzle 2 in order to prevent opposite wall portions of the tube 8 from contacting each other and welding together. As the tube descends, its free lower extremity is engaged by the closing means 5 (FIG. 3) which severs and seals it to close the tube. The severed portions of the tube can fall into a collector 40 which is temporarily interposed between the mold halves. The closing means 5 can be so arranged as to be shiftable in the direction of extrusion of the tube 8 (arrow 41) so that continuous extrusion is not impeded. Disposed vertically below the extrusion means 12 is a support means 10 which can be shifted upwardly to engage the bottom extremity 11 of the tube as indicated by arrow 42 (FIG. 4).

Figure 10:
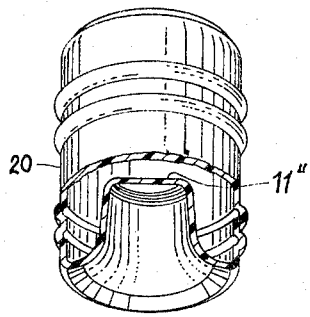
FIG. 10 is a perspective view, partially in section, showing a receptacle produced with the aid of the apparatus of FIG. 9.
Figure 11:
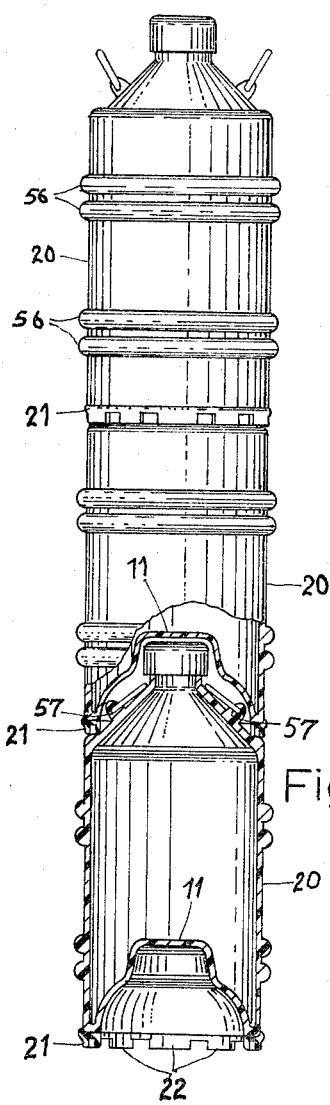
FIG. 11 is an elevational view, partly in section, of a plurality of receptacles produced in accordance with this invention in stacked relationship.
Figure 12:
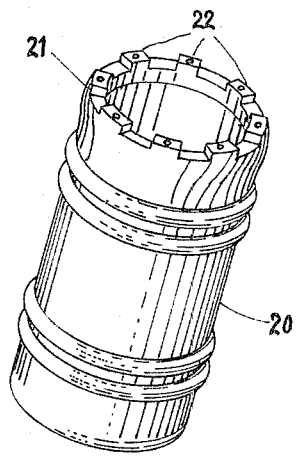
FIG. 12 is a bottom-perspective view of one of the receptacles.

Upon engagement of support plate 10, which is upwardly convex as indicated in FIGS. 3 and 5, the tube 8 descends therewith and is embraced by the mold halves 6 and 7 whereupon continued introduction of air via nozzle 2 results in a shaping of tube 8 in conformity with the configuration of the mold cavity (FIG. 5). The shaping air pressure is preferably much higher than the pre-expansion pressure (e.g., several times as high). The mold is then opened and the finished receptacle 20 supported on plate 10 which can descend further for removal of the receptacle from the region of the mold and for further processing. The convex plate 10 produces a downward concavity at the bottom 11 of the receptacle. As can be seen from FIG. 6, the extrusion means 12 can comprise a storage cylinder 43 adapted to receive a plasticized mass 44 of extrudable material which forms the closed tube 8. Under the pressure of air from the nozzle 2, the walls of this tube swell somewhat without thinning. The piston 45 is illustrative of any means for extruding the mass 44 out of the discharge opening 12' and is displaced via the connecting rod 46 of a hydraulic power source 47. This source is directly coupled with the stem 10' of plate 10 via a link means 48, which can be mechanical, electrical or hydraulic in nature, to insure that the descent of plate 10 occurs at the rate of extrusion of the tube 8. Thus any elongation of the latter as a consequence of its weight is avoided. The stem 10' can constitute the piston rod of a hydraulic cylinder 49 which effects a rise of the plate 10 into engagement with the tube. Plate 10 and mold halves 6, 7 are so designed that the plate forms the bottom or floor of the mold cavity (as will be described in further detail with reference to FIGS. 9 and 10) and, consequently constitutes holding means within the mold for supporting the tube. The configuration of this plate can be such that the concavity formed in the bottom of the receptacle is of sufficient depth to receive without contact the neck of a receptacle disposed therebelow upon stacking (FIG. 11).

Figure 7:
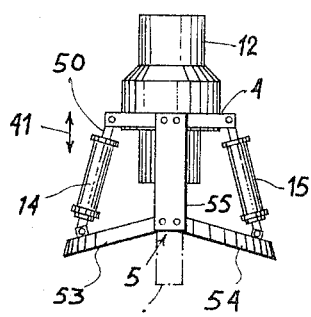
FIG. 7 is a side-elevational view of a closing means according to the present invention.

In FIGS. 7 and 8 the closing means 5 is illustrated in greater detail. The closing means comprises a traverse rod 4 which can be vertically displaced in the direction of the arrow 41 so that the closing means can descend together with the tube 8 without interrupting its extrusion and be displaced upwardly again for engagement with a subsequently extruded tube. The piston rods 50 and 51 of a pair of hydraulic cylinders 14 and 15 are pivoted to the traverse rod 4 at opposite extremities thereof, the cylinders 14 and 15 being, in turn, articulated to clamping jaws 53 and 54 of circular-segmental configuration. These jaws 53 and 54 are also hinged to a pair of support plates 55 depending from the aforementioned extremities of the traverse rod 4. When the hydraulic cylinders 14 and 15 are actuated, the segmental clamping jaws 53 and 54 are swung downwardly to engage the tube 8 which is indicated in dot-dash lines in FIG. 7. The jaws are formed with juxtaposed surfaces adapted thermally to weld the tube shut along an arcuate seam and to sever excess material therefrom.

Figure 9:
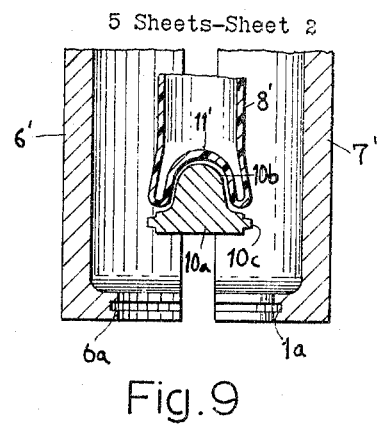
FIG. 9 is an axial cross-sectional view through a portion of two mold halves showing the relationship thereof to the support means according to the invention.

In FIG. 9, there is shown a specific mold structure 6', 7' wherein these mold halves are provided with a pair of recesses 6a, 7a, respectively, which are designed to receive an annular flange 10c of the support member 10a whose upper portion is convex as is indicated at 10b to produce an inner convexity 11' at the base of tube 8'. When support member 10a has its flange 10c aligned with the recesses 6a and 7a, the mold halves 6' and 7' are displaced relatively toward one another to engage the support body 10a which then constitutes the base of the mold cavity. Since air is continuouesly introduced into the tube 8' as it is extruded, only continued introduction of this air is necessary to urge the walls of this tube against the mold cavity and produce the receptacle 20 illustrated in FIG. 10 although an increased supply is generally desirable.

Figure 23:
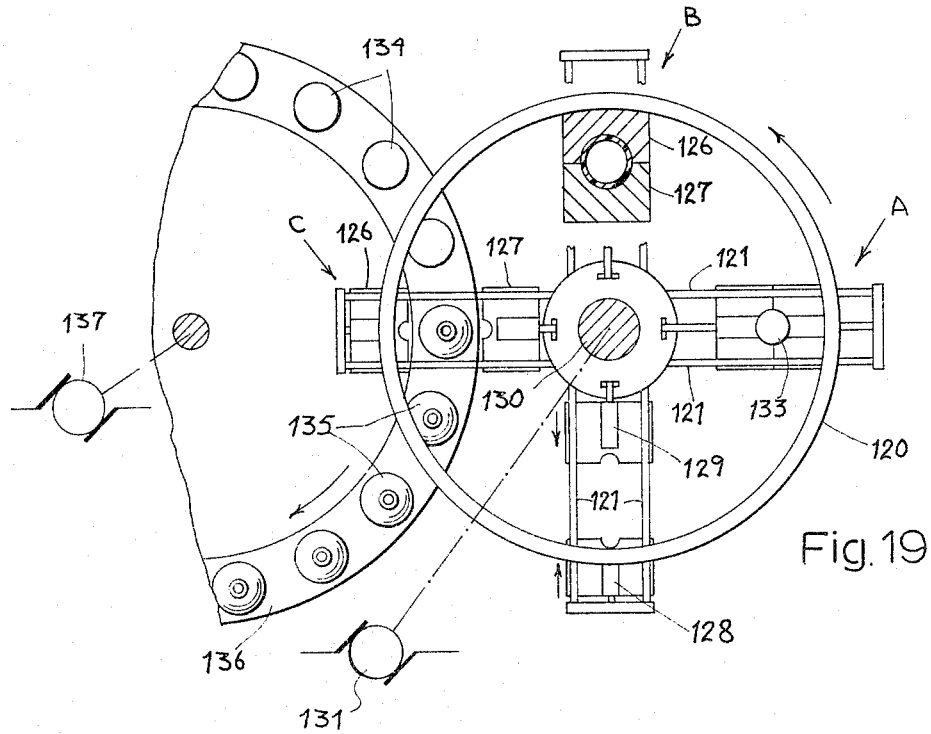
FIGS. 23 and 24 are perspective views of other receptacles produced in accordance with the present invention.
Figure 24:
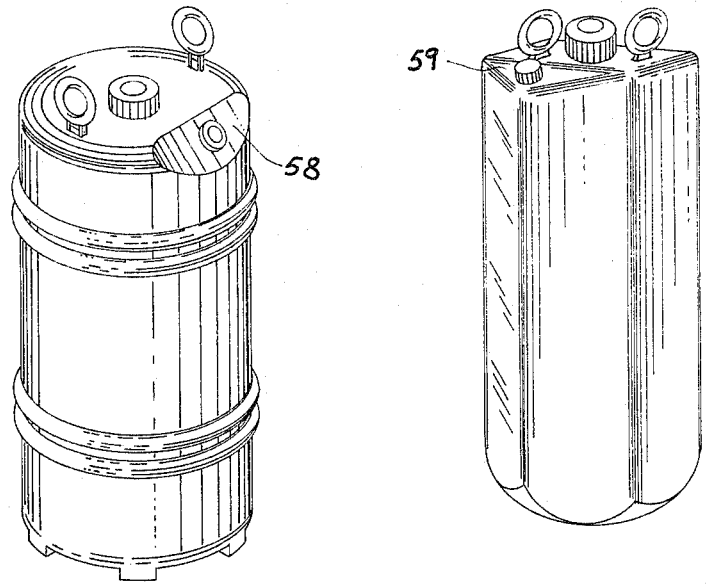

The finished body is formed with a deep recess 11' capable of receiving the neck of a vessel for stacking purposes without any thinning out of the bottom marginal portions of the vessel. As indicated in FIG. 11, each vessel can be provided with a plurality of axially spaced reinforcing rings which are similar to the hoops normally provided on barrels and the like. In addition, a palletizing ring 21 can be thermally bonded to the wall of each receptacle at its base and serve to reinforce the latter. The ring 21 can be composed of a material having a greater resistance to wear than that constituting the wall of the vessel and, according to a feature of the invention, can be inset with metallic studs 22 to further increase its life. The rings 21 may also have a generally undulated configuration to permit the circulation of air beneath the bottom of the vessel, a feature which is particularly important when the vessels containing gases are stacked. Moreover, the ring can be provided with formations matingly engageable with corresponding formations on the upper surface of a vessel to be disposed therebelow. These formations thus will resist lateral shifting of the stacked vessels. The handle lugs 57, reinforcing hoops 56, and pallet ring 21 can all be bonded to the wall of the expanded tube in a single operation if these rings, lugs and hoops are disposed within suitable recesses of the mold prior to expansion of the tube. Since the extruded plastic material is generally in a heated state and the air is of sufficient pressure to effect thermal welding, a complete bonding can be expected and is attained. In FIGS. 23 and 24, I show other receptacle shapes which can be produced in accordance with the present invention. The receptacles of FIGS. 23 and 24 are characterized by reinforced corner portions 58, 59 in which fittings for the discharge of the contents of the vessel are provided. This feature of the present invention will be described with greater detail subsequently.

Figure 13:
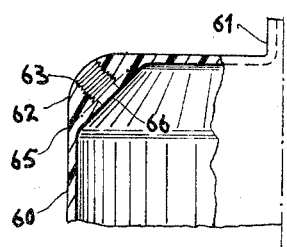
FIG. 13 is a partial axial cross-sectional view showing a modified receptacle.
Figure 14:
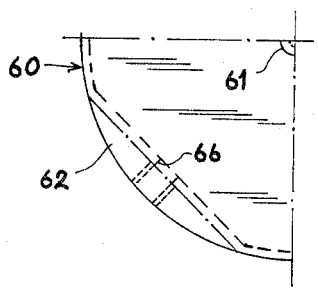
FIG. 14 is a partial plan view of the receptacle of FIG. 13.

FIGS. 13 and 14 illustrate the the corner construction of a vessel of the type shown in FIG. 23 or FIG 24. The vessel 60 is provided with a corner-reinforcing body 62, which is integrally bonded with the wall of the vessel 60 along their interface 65, and is provided with a metallic ferrule 63. The latter is internally threaded and forms a guide for a boring tool which can be inserted therein to produce an aperture 66 in alignment with the passage of the ferrule. The vessel 60 has a neck 61, which can be provided with a suitable cover, through which the receptacle can be filled, with the passage 66 serving to discharge the contents of the receptacle. The threaded fitting 63 is designed to receive a discharge valve or conduit in the usual manner.

FIG. 15 illustrates a mold means suitable for producing the receptacles previously described. The mold means comprises two mold halves 67, 68 which together define a mold cavity 69. The wall of this cavity is recessed or provided with holding elements adapted to retain the reinforcing and transporting bodies to be thermally bonded onto or into the wall of the tubular receptacle. These bodies include the reinforcing hoops or rings 70, 71 which are each bipartite and come together when the mold is closed to produce a closed annular element. Additionally, handle members 74 and 75 can be provided as can a corner element 76 which is preformed with a metallic ferrule 77 as previously mentioned. A neck-reinforcing ring 78, provided with a spout 83, can also be set in place within a suitable recess. The mold cavity is also provided with lugs 79 and 80 into which a pair of metallic rings can be set to form additional carrying handles. The bottom of the mold cavity receives a transporting ring 72 which, although of semicircular construction, forms an annular member substantially integral with the wall of the vessel and carries a plurality of casters 73. These casters are representative of any antifriction device and may, of course, be replaced by other types of transport rollers or studs. The convex supporting plate 10 forms the bottom of the mold cavity as previously described. When the mold 67, 68 is closed around the tube 8, for example, and the latter is inflated by air pressure, the tube is thermally welded under the pressure of the air source to the various reinforcing bodies 70–80 without requiring auxiliary heatbonding equipment. FIG. 16 shows the receptacle 84 produced with the aid of the mold 66, 67.

In FIG. 17, there is shown an arrangement for producing laminated or multiwall vessels in accordance with the present invention. The extrusion means 90 in this case consists of an outer extruder 91 whose outlet 92 is concentric with and outwardly of an inner outlet 94 of a smaller-diameter extruder 93. A relatively small-bore tube 95 is produced by the inner extruder 93. This tube is closed at its end in the manner previously described. The larger extruder then or concurrently forms an outer tube 96 which, under the pressure of air from nozzle 97, is laminated onto the inner tube within the mold.

FIG. 18 illustrates the supply magazines for the apparatus of FIG. 17. A masticating or plasticizing device 100 feeds the outer storage cylinder 91 of the extrusion press as well as the inner storage cylinder 93. The masticator can comprise a worm 101 which is rotatably mounted on its motor-driven shaft 102 in a housing 103 which converges in the direction of its outlet 104. A hopper 105 continuously supplies the worm which plasticizes the material and forces it into the outer cylinder 91 via a bore 106 therein. The piston 107 of this cylinder is so arranged that it blocks an aperture 108 in the worm of inner cylinder 93 when the outer chamber 109 is to be filled. Subsequently, the piston 107 is displaced downwards, so that its passage 110 is aligned with bore 106 and aperture 108 to admit the flowable plastic material into the inner chamber 101. An annular piston 112 slidably mounted in the inner chamber serves to extrude the material from the outlet 94 and produces the inner tube 95. Similarly annular piston 107 serves to urge the material through outlet 92 and produces the outer tube. A mandrel 113 is coaxially positioned within the inner cylinder 93 and provides the nozzle 97 for expanding the tubes. The construction described with reference to FIG. 18 is only representative of systems wherein a single plasticizing worm 100 etc. can supply a plurality of storage cylinders. It is also conceivable that the cylinders and masticating device can be shifted relatively to permit additional cylinders to register with its outlet 104.

In FIG. 19 I show an arrangement for the serial production of receptacles while making use of the principles of the present invention. The apparatus includes a turret 120 upon the radial rails 121, on which are slidably mounted respective pairs of mold halves 126, 127 which together define the respective mold cavities. The mold halves are slidably displaceable in radial direction between an open and a closed position, via respective fluid-operated cylinders 128, 129. The support shaft 130 of the turret is rotatably driven by a motor 131 and successively displaces the molds from an extrusion station A, at which the extrusion device is only diagrammatically shown at 133, to a cooling stage B and thence to a discharge station C prior to its return to the extrusion station. At the extrusion station A, a tube is preliminarily expanded by air pressure while being extruded, and the mold cooled therearound. Continuation of the introduction of air results in the shaping of the tube to conform to the mold configuration. When the tube has set, the turret 120 swings angularly through 90° to carry it into position B wherein further cooling within the confines of the mold with or without introduction of air is carried out. After the air pressure is terminated, the mold swings through another 90° into the position indicated at C, whereupon it opens to permit a vertically displaceable support 134 to swing the receptacle 135 clockwise and laterally out of the mold. A plurality of such supports are angularly displaceable upon a rotatable table 136 which is driven by a motor 137 and carries the vessels away for further treatment.

Figure 20:
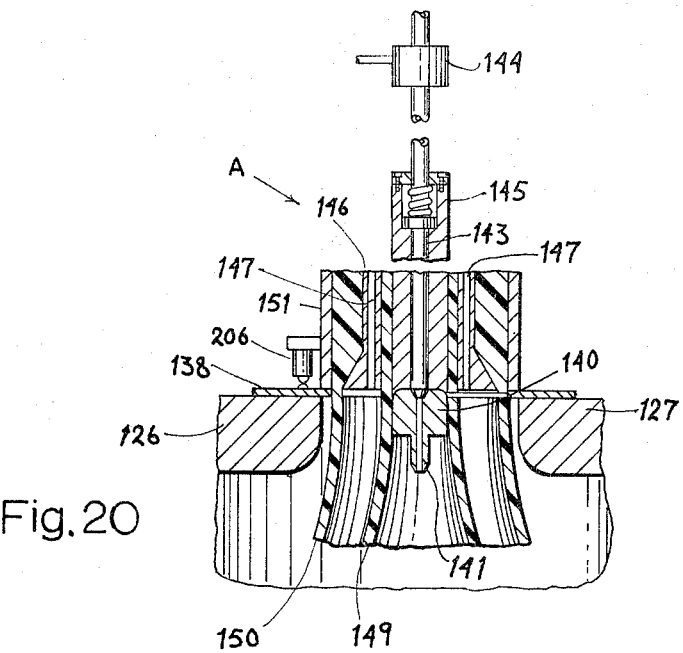
FIG. 20 is an axial cross-sectional view of an extrusion station adapted to be used with the apparatus of FIG. 19.

FIG. 20 shows, somewhat diagrammatically, an extrusion station capable of producing vessels in conjunction with the apparatus, FIG. 19. It may be seen that the turret 120 is, in this instance, also provided with a plate 138, associated with each mold 126, 127 upon which the mandrel 140, with its nozzle 141, is mounted by means of a spider 142. As each mold swings into position beneath the extrusion station, the mandrel 140, which moves into and out of position is releasably engaged by a spring-loaded vertically movable tube 143. This tube conducts air from a pressure source via an electromagnetic valve 144 to the nozzle 141 and is slidable within a core 145 of the extrusion device. This core is coaxially surrounded by the inner extrusion cylinder 146 which also is provided with air passages 147, the latter being angularly spaced around the cylinder 146. These air passages terminate at nozzles 148 intermediate the inner tube 149 and the outer tube 150 extruded by cylinders 146 and 151, respectively. This arrangement permits the formation of double-wall receptacles with a clearance between at least some wall positions. When the mold 126, 127 closes, it clamps the necks of the tubes against the mandrel 140 which is retained within the tubes as the mold is displaced to a subsequent station for further cooling. The mandrel is thus removably associated with the extrusion device, so that there is no need to retain a filled mold at extrusion device during cooling.

The arrangement of FIG. 21 is generally similar to that of FIG. 20 with the exception that the tube 150' is extruded directly against the inner tube 149' by the outer cylinder 151'. In this case, the mandrel 140' may have its nozzle 141' connected with a conduit 143' contained within the spider 142' and may be provided with its electromagnetic valve 144' on the turret 120. This arrangement permits the shifting of the mandrel away from the extrusion station A' without reduction in the air pressure supplied to the tubes.

Figure 22:
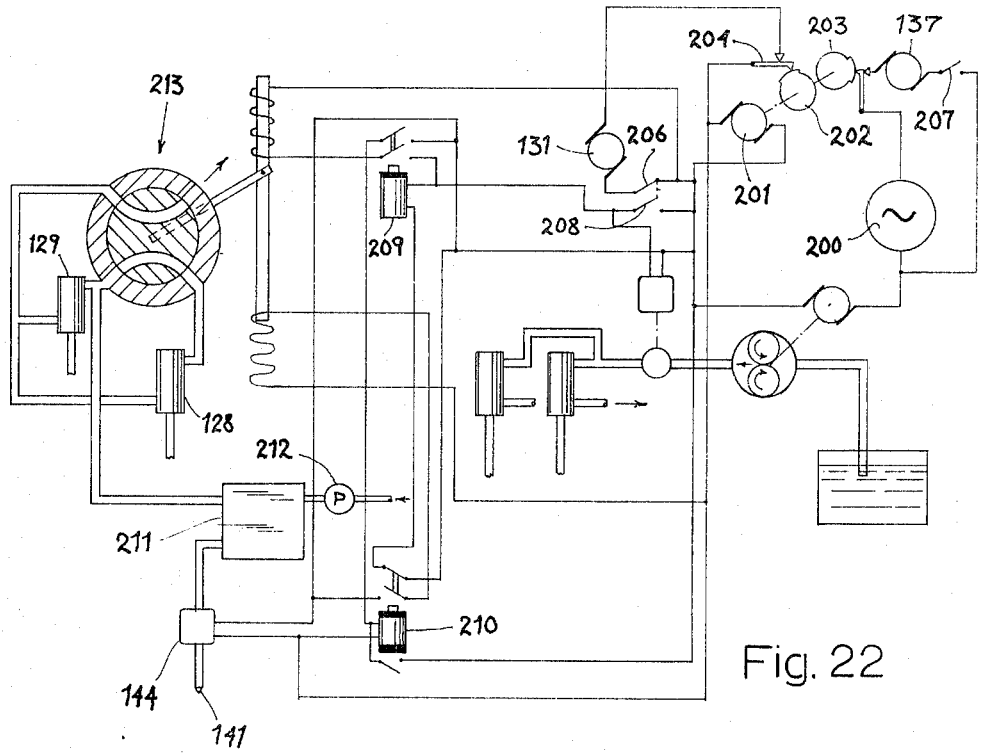
FIG. 22 is a circuit diagram of a control system for the apparatus of FIG. 19.

FIG. 22 illustrates a circular arrangement for the control of an apparatus for producing large-capacity receptacles of the general type shown in FIG. 19. The control system comprises a source of power 200 across which is bridged a timer motor 201 whose cams 202 and 203 operate receptive switches 204, 205 to drive motors 131 and 137 associated with the turntables 120 and 136. The circuit for motor 131 includes a microswitch 206 (FIG. 20) located at the extrusion station A, which halts turntable 120 in the proper position. A similar microswitch serves to position turntable 136 for discharge of a receptacle.

Switch 206 is ganged with a pair of normally open contacts 208 in series with a time-delay relay 209. Upon actuation of switch 206 and 208 a circuit is immediately closed to the electromagnetic valve 144 to admit air to the nozzle 141 from the reservoir 211 of a compressor 212. Shortly thereafter and at a time determined by the delay of relay 209 (i.e., a period sufficient to permit extrusion of the appropriate length of the tube) one coil of a solenoid valve 213 is energized to shift this valve into the position shown. Air then flows from the reservoir 211 to the pneumatic cylinders 128, 129 which close the mold. Through the activation of relay 209 and with a predetermined time delay, relay 210 is connected to cut off relay 209 and energize the other coil of valve 213 to open the molds. Since relay 210 is both a delayed-operation and delayed-inactivation device, the air supply is cut off via a valve 144 prior to the opening of the mold. The timer 201 etc. thereafter displaces the turret to restore switches 206 and 208 and reset the apparatus. While the control system is shown but for a single mold, only minor modification is necessary to supply it to the multimold system of FIG. 19. It suffices to note that it is desirable in general to control the air flow by means of an electromagnetic valve and to provide a time-delay relay between the mold-closing system and the valve to insure that the latter will operate to terminate the flow of air prior to opening of the valve.

The invention as described and illustrated is believed to admit of many modifications within the ability of persons skilled in the art, all such modifications being deemed within the spirit and scope of the appended claims.

I claim:

1. A method of producing large-capacity receptacles from an extrudable plastically deformable material, comprising the steps of extruding a tube of said material generally downwardly; closing the free lower extremity of said tube while imparting thereto a downward convexity by sealing said lower extremity along a downwardly convex arcuate seam; supporting the closed extremity of said tube upon an upwardly convex platform while continuing the extrusion thereof to limit thinning of the tube walls; introducing an expansion fluid under relatively low pressure into the closed tube simultaneously with the extrusion thereof; and subsequently enclosing said tube within a generally cylindrical mold cavity with said platform defining the bottom of said cavity while blow molding said tube with an expansion fluid under relatively high pressure to impart thereto the configuration of said cavity.

2. An apparatus for producing large-capacity receptacles from an extrudable plastically deformable material, comprising extrusion means for extruding a tube of said material generally downwardly; means for closing the free extremity of said tube by sealing the lower extremity of said tube along a downwardly convex arcuate seam; nozzle means for introducing into said tube during the extrusion thereof a fluid under pressure; and mold means provided with a generally cylindrical mold cavity with an upwardly convex bottom surface engageable with said lower extremity of said tube, said mold cavity being adapted to receive said tube and impart thereto the configuration of said mold cavity upon expansion of said tube by a fluid under pressure.

3. An apparatus as defined in claim 2 wherein said mold means is provided with holding means within said cavity for carrying a reinforcing and transporting element to be thermally bonded to said tube upon expansion thereof to conform to the configuration of said cavity.

4. An apparatus as defined in claim 3 wherein said holding means includes recesses provided within the wall of said cavity.

5. An apparatus as defined in claim 3, further comprising vertically displaceable support means aligned with said extrusion means and provided with said upwardly convex surface for engagement with said extremity of said tube for carrying the latter.

6. An apparatus as defined in claim 5 further comprising coupling means between said extrusion means and said support means for displacing the latter downwardly at substantially the rate of elongation of said tube.

7. An apparatus as defined in claim 3, wherein said means for closing the extremity of said tube comprises at least one pair of relatively displaceable clamping surfaces disposed forwardly of said extrusion means in the direction of travel of said tube for thermally bonding edges of said tube together at said extremity.

8. An apparatus as defined in claim 7, further comprising collector means cooperating wtih said clamping means for receiving severed portions of said tube.

9. An apparatus as defined in claim 2 wherein said extrusion means includes an annular outlet for said material and a mandrel coaxial with said outlet, said nozzle means being mounted upon said mandrel, said mandrel and said nozzle means being displaceable away from said outlet to permit removal therefrom of a tube within its mold and the extrusion of a further tube through said outlet.

10. An apparatus as defined in claim 2 wherein said extrusion means includes a plurality of substantially concentric outlets for the extrusion of a plurality of coaxial tubes.

11. An apparatus as defined in claim 10 wherein said outlets each communicate with a respective storage cylinder, said extrusion means further comprising a worm-type masticating device supplying said cylinders.

12. An apparatus as defined in claim 2 wherein said nozzle means is provided with a fluid-supply conduit including an electromagnetic control valve, said mold means comprising at least two relatively displaceable mold halves and drive means for displacing said mold halves between an open and a closed position, further comprising control means including a time-delay relay connected between said valve and said drive means for delaying the opening of said mold means until the supply of fluid to said nozzle means is terminated.

(References on following page)

References Cited by the Examiner

UNITED STATES PATENTS

| | | | |
|---|---|---|---|
| 2,349,177 | 5/1944 | Kopitke | 264—98 X |
| 2,632,202 | 3/1953 | Haines | 264—98 |
| 2,756,461 | 7/1956 | Hadley | 264—99 X |
| 2,959,812 | 11/1960 | Allen | 264—98 X |
| 3,023,461 | 3/1962 | Sherman | 264—98 |
| 3,024,942 | 3/1962 | Schmitz | 220—71 |
| 3,050,773 | 8/1962 | Hagen | 264—98 |
| 3,088,626 | 5/1963 | Van Leer et al. | 220—71 |
| 3,089,186 | 5/1963 | Park. | |
| 3,091,803 | 6/1963 | Scott et al. | |
| 3,103,036 | 9/1963 | Nave et al. | 264—98 |

ROBERT F. WHITE, *Primary Examiner.*

THERON E. CONDON, ALFRED L. LEAVITT,
*Examiners.*

R. A. JENSEN, A. R. NOE, *Assistant Examiners.*